United States Patent
Vega

(10) Patent No.: US 7,428,626 B2
(45) Date of Patent: Sep. 23, 2008

(54) METHOD AND SYSTEM FOR A SECOND LEVEL ADDRESS TRANSLATION IN A VIRTUAL MACHINE ENVIRONMENT

(75) Inventor: Rene Antonio Vega, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 11/075,211

(22) Filed: Mar. 8, 2005

(65) Prior Publication Data

US 2006/0206687 A1    Sep. 14, 2006

(51) Int. Cl.
    *G06F 9/34* (2006.01)
(52) U.S. Cl. .................. 711/203; 711/202; 711/206
(58) Field of Classification Search .............. None
    See application file for complete search history.

(56) References Cited

U.S. PATENT DOCUMENTS 7,089,377 B1 *  8/2006  Chen ......................... 711/147
2006/0075285 A1 *  4/2006  Madukkarumukumana et al. ........................... 714/5
2006/0161719 A1 *  7/2006  Bennett et al. ............. 711/6

* cited by examiner

*Primary Examiner*—Reginald G. Bragdon
*Assistant Examiner*—Thanh D Vo
(74) *Attorney, Agent, or Firm*—Woodcock Washburn LLP

(57) ABSTRACT

A method of performing a translation from a guest virtual address to a host physical address in a virtual machine environment includes receiving a guest virtual address from a host computer executing a guest virtual machine program and using the hardware oriented method of the host CPU to determine the guest physical address. A second level address translation to a host physical address is then performed. In one embodiment, a multiple tier tree is traversed which translates the guest physical address into a host physical address. In another embodiment, the second level of address translation is performed by employing a hash function of the guest physical address and a reference to a hash table. One aspect of the invention is the incorporation of access overrides associated with the host physical address which can control the access permissions of the host memory.

15 Claims, 7 Drawing Sheets

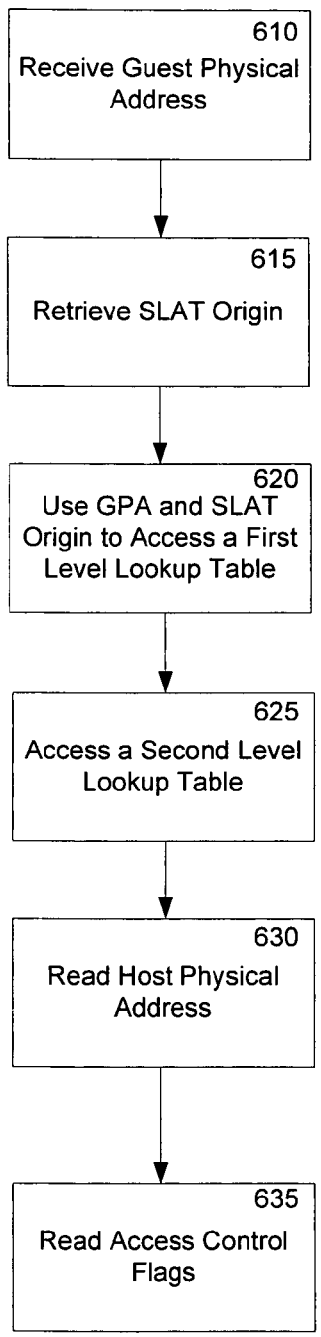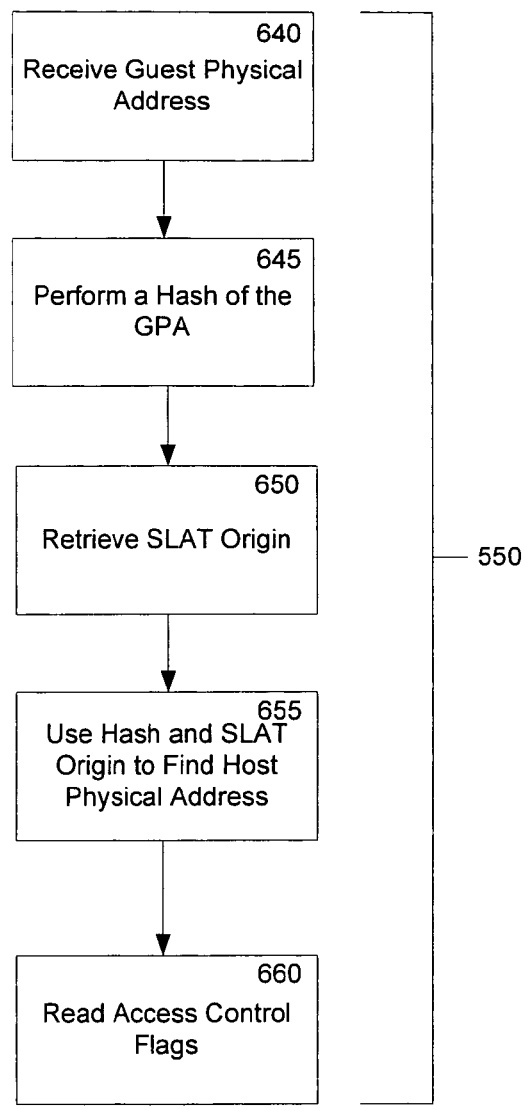
Fig. 6a
Fig. 6b

METHOD AND SYSTEM FOR A SECOND LEVEL ADDRESS TRANSLATION IN A VIRTUAL MACHINE ENVIRONMENT

FIELD OF THE INVENTION

The invention relates to the field of computer programming. More specifically, the invention relates to address translation from a guest virtual address to a host physical address in a virtual machine environment.

BACKGROUND OF THE INVENTION

Virtual computing allows multiple virtual machines, each having their own operating system, to run on a host computer. The host computer has a virtualizer program that allows the host computer to emulate the instructions of a virtual machine program; which may have a different CPU model than the host computer. The host computer virtualizer program can also virtualize the hardware resources of the host machine for virtual machine use. The virtual machine that is requesting hardware resources such as CPU, memory, I/O and disk space is called a guest with respect to the host computer.

In a virtual machine, the guest computer system only exists in the host computer system as a pure software representation of the operation of one specific hardware architecture. The terms virtualizer, emulator, direct-executor, virtual machine, and processor emulation are sometimes used interchangeably to denote the ability to mimic or emulate the hardware architecture of an entire computer system using one or several approaches known and appreciated by those of skill in the art. A virtualizer program executing on the operating system software and hardware architecture of the host computer mimics the operation of the entire guest computer system.

The virtualizer program acts as the interchange between the hardware architecture of the host machine and the instructions transmitted by the software (e.g., operating systems, applications, etc.) running within the emulated guest virtual machine environment. In one virtual machine environment embodiment, the emulated environment may include a virtual machine monitor (VMM) which is a software layer that runs directly above the host hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it. In a virtual machine environment, the multiple virtual machines impose performance requirements on the hardware resources of the host machine. It is desirable to keep one virtual machine separated from the other virtual machines as well as separated from the host. Separation or isolation of one virtual machine from another is useful to segregate errors and faults such that one virtual machine fault does not affect another virtual machine. Thus, some virtual machine embodiments map the virtual machine hardware accesses into separate host computer system resources. One such resource is random access memory. This important system resource must be carefully managed in a virtual machine environment.

One type of CPU that may be used as a host computer resource is the x86 family of processors. This family has a built-in memory address lookup mechanism that allows a virtual address, say in one application, to be converted to a physical address via a process known as a page walk or paging. FIG. 1 shows a typical prior art page walk process, implemented in hardware in an x86 processor family.

A typical x86 family processor running with the paging enabled relies on a set of page descriptors and page tables to create a sparse map of virtual address to physical address translations. Such machines can extend the mapping structure by introducing a third lookup table, the page descriptor page tables (PDPT), and larger page table entries (PTE) to produce a physical address.

FIG. 1 represents a standard x86 family scheme 100 for determining a physical address from a virtual address. This first level translation is a hardware oriented translation and is built into the x86 hardware such that a physical address may be quickly derived from a virtual address. The virtual address is provided by the processor control register 110. In the example of a x86 machine, the control register is known as CR3. Control register data 115 is used to access a page descriptor table 120 which provides an index 125 to select a multiplicity of page descriptor tables 130, 140. In the FIG. 1 example, the page descriptor table 140 provides a reference to a specific page table from a multiplicity of page tables 150, 160, 170. A specific entry 180 in a selected page table 175 is selected by a reference obtained from the page descriptor data 145. The entry 180 is the physical address corresponding to the virtual address contained in the control register 110. This hardware oriented scheme provided by the x86 family is considered a fast and efficient way to convert a virtual address into a physical address useful for an application being run on the x86 processor.

The x86 processor may also contain a translation look-aside buffer (TLB) in which it places the most recently traversed table mappings, placing within the TLB the virtual address and related physical address. Subsequent processor memory accesses look to the TLB to avoid the page table walk of FIG. 1 resulting in higher efficiency in machine cycle use. But this efficiency is not normally used in the virtual machine environment.

When an operating system is executing in a virtual machine created by a VMM, the physical addresses of the guest are virtualized and it is often the case that these guest physical addresses do not correspond to host physical addresses. Consequently, these guest-generated page tables cannot be directly traversed by the address translation hardware described in FIG. 1. Instead, the Virtual Machine Monitor (VMM) refers to guest-generated tables to create a corresponding new set of shadow page tables to create mappings of the guest virtual addresses to host physical addresses. Accordingly, when a guest virtual address is loaded into the control register 110 by the guest virtual machine operating system, the page table walk results of FIG. 1 may become non-applicable and a machine exception is generated. The machine exception can then access a routine in the VMM to use the control register guest virtual address to point to the shadow mappings created by the VMM. This VMM intervention is very expensive in terms of machine cycles. Although the hardware oriented page walk of FIG. 1 may take on a dozen or so machine cycles, the VMM intervention may take thousands of machine cycles.

In addition, any changes the guest virtual machine makes to its page tables require VMM intervention to update the corresponding shadow page tables. The overhead of shadow page table maintenance is high both in time consumed to maintain the shadow mappings and in the memory space consumed by the shadow mappings. The VMM has to intercede any time the guest operating system makes any substantive changes to its mappings.

In addition, the translation look-aside table (TLB) cache, which normally speeds up processor operation, is largely rendered ineffective by a VMM intervention. The TLB is cleared any time multitasking occurs within a selected virtual machine. The TLB is also cleared any time the context changes from one virtual machine or guest to another virtual machine or guest. Thus, the implementation of virtual machine operation can adversely affect not only the hardware schemes for quick address lookup, such as the TLB, but also adversely affect the effectiveness of the page walk hardware.

Thus, there is a need for a method and system to implement fast memory translation from a guest virtual address to a host physical address in a virtual machine environment. It would be advantageous to take advantage of hardware already in place to facilitate a virtual address to physical address translation. The present invention addresses the aforementioned needs and solves them with additional advantages as expressed herein.

SUMMARY OF THE INVENTION

Aspects of the invention solve the problem associated with a virtual machine monitor (VMM) having to maintain a virtual machine's page table mappings and overhead associated with such activity. Embodiments of the invention describe methods and a system to build new mapping structures that can be traversed by a processor's address translation hardware to allow the guest page tables to be directly referenced with minimal or no VMM intervention.

In one aspect of the invention, a host CPU receives a guest virtual address from a guest program operating in a virtual machine. The host CPU is permitted to use its page walk hardware to produce a guest physical address. A second level of address translation is needed to translate the guest physical address to a host physical address. One embodiment of the second level translation involves traversing a two-tier tree structure to arrive at a host physical address. This embodiment uses the guest physical address as an index in the tree traversal. Another embodiment involves using the guest physical address as input to a hash algorithm where a host physical address can be obtained from a guest physical address.

In one aspect of the invention, a translation look-aside buffer is updated after a second level address translation to increase the speed of future accesses to a target host physical address. In another aspect of the invention, access control information which can place limits on the use of a host memory location are read when a host physical address is obtained. This access information can override the guest physical address access control so that the host memory is properly protected in the virtual machine environment.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings:

FIG. 6a is a flow diagram for a first exemplary method of performing a second level address translation according to aspects of the invention;

FIG. 6b is a flow diagram for a second exemplary method of performing a second level address translation according to aspects of the invention.

DETAILED DESCRIPTION OF ILLUSTRATIVE EMBODIMENTS

Overview

Figure 1:
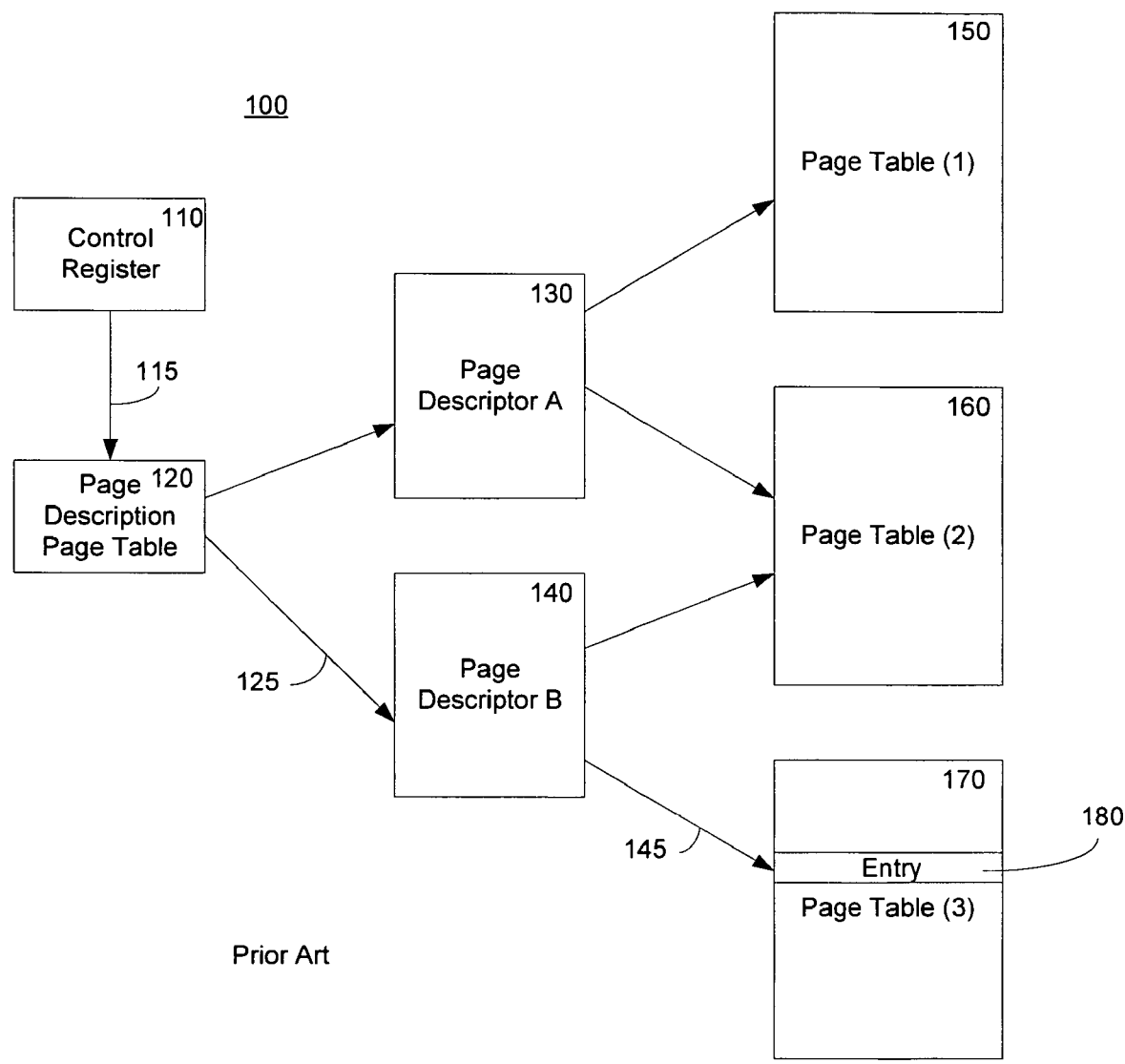
FIG. 1 is a block diagram of a prior art scheme of determining a physical address from a virtual address.

FIG. 1, described above, outlines a typical hardware oriented page walk for a x86 based CPU. In a virtual machine environment, the page hardware page walk is not used because a virtualizer, such as a virtual memory monitor (VMM) is needed to determine the host physical address from a guest virtual address. However, an improvement could be achieved if the hardware oriented page walk of FIG. 1 can be used instead of the VMM intervention to determine a host physical address.

The hardware oriented page walk provides the first level translation of a guest virtual address to a guest physical address. If a second level translation that translates a guest physical address into a host physical address can be added at points 115, 125, 145, and 180 of FIG. 1, then the hardware of the host CPU may be used to advantage. It is desirable to perform the guest virtual address to host physical address translation without requiring any changes to the guest code or data structures it creates to represent the logical to physical translations. This method is transparent to the guest operating system.

Exemplary Embodiments of the Invention

According to an aspect of the invention, if a translation look-aside buffer (TLB) is used, a successful hit on the buffer with a guest virtual address would allow the TLB to translate the guest virtual address directly to a host physical address. This type of operation in a virtual machine environment allows the host processor to efficiently execute the virtual machine application. If however, the host processor TLB does not contain a guest virtual address to host physical address entry, then a translation is needed and aspects of the current invention may be employed. Instead of software based shadow table translation maintenance, as discussed above in the prior art, the current invention utilizes the hardware based TLB miss/fill process to perform a translation to determine a host physical address from a guest virtual address.

Figure 2:
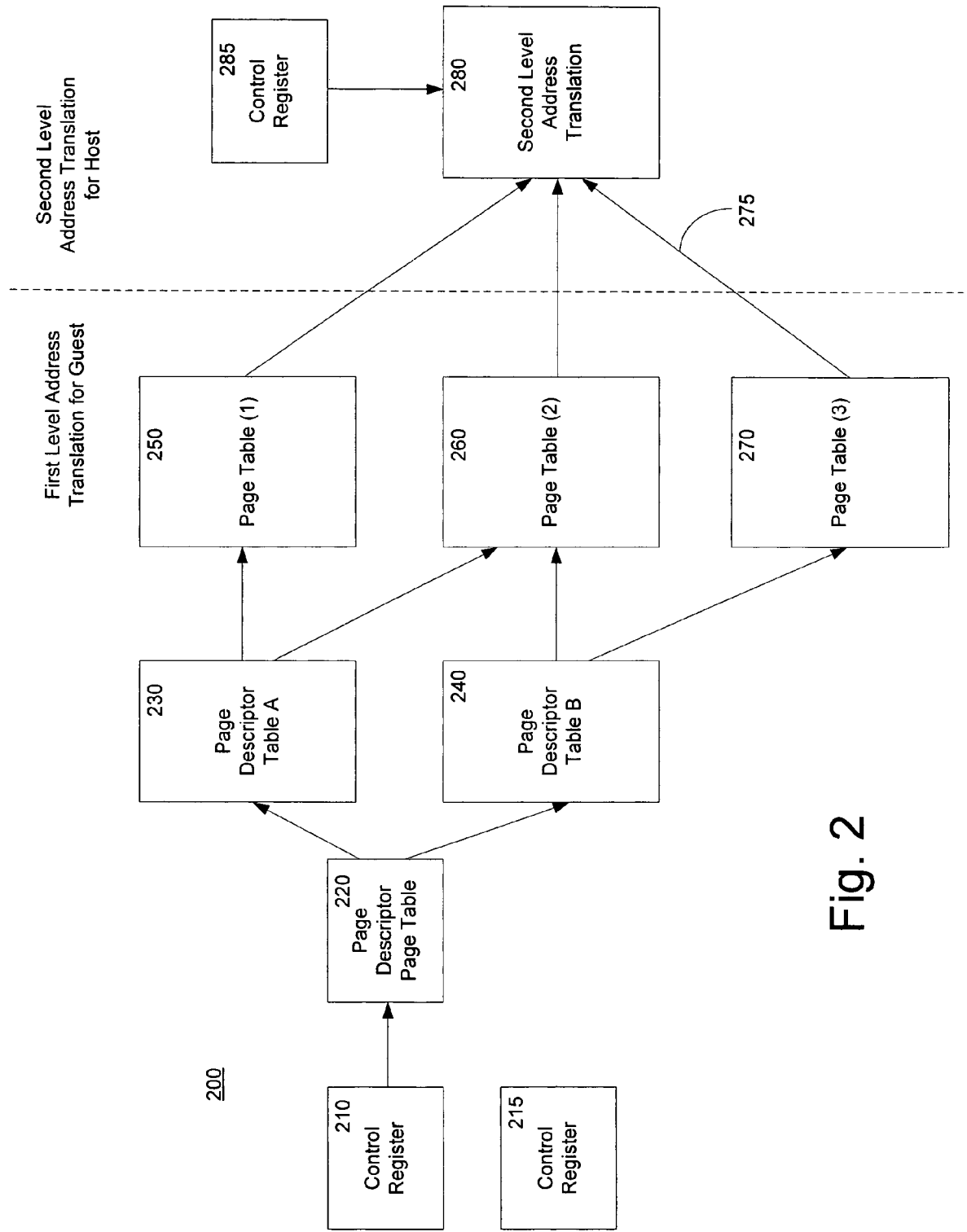
FIG. 2 is an exemplary scheme to determine a host address in a virtual machine environment according to the invention.

FIG. 2 is a depiction 200 of an address translation scheme for virtual machines according to aspects of the invention. A control register 210 is initially loaded with a guest physical address of the guest page tables. A subsequent access to a guest virtual address occurs. Assuming that an associated TLB does not have the guest virtual address to host physical address entry, then a full address translation procedure may be undertaken according to the invention. The action of accessing the guest virtual address can start the hardware oriented first level address translation for the guest virtual machine. The guest virtual address is provided to a page descriptor page table 220 which provides an address for a page descriptor 230 or 240. The page descriptor references one of many page tables, 250, 260, and 270 all which are accessed by way of guest physical addresses. The page tables contain entries that provide a guest physical address. Thus the first level of translation provides a translation, in a virtual machine, from a guest virtual address to a host physical address.

However, a guest physical address cannot be used directly by the host computer to access hardware resources allocated to the virtual machine operation. A second level of address translation is needed to resolve the intermediate and the final guest physical address accesses and output of the first level address translation to a host physical address which the host computer can use to access hardware resources for the virtual machine. Accordingly, the guest physical address is provided, via 275, to the second level address translation 280.

The guest physical addresses are resolved into host physical addresses by referring to a second level address translation (SLAT) table which is indexed by guest physical addresses. The processor of the host computer determines if it is using a SLAT process by examining an enablement flag stored in a control register 215. In an x86 CPU environment, this second control register 215 can be CR4. Yet another control register 285 contains the host physical address of the SLAT table origin. This control register 285, when used with the guest physical address input 275, assists the second level address translation 280 to reference a final host physical address.

According to the present invention, in a host computer with second level address translation enabled, the VMM permits the guest to load the real processor's page table origin control register 210 with the guest physical address values because all page table walks and physical addresses are relocated or controlled by a SLAT table associated for the virtual machine which is maintained by the VMM.

Additional processor controls can be provided to modify the behavior of the processor to allow control register 210 to be set directly by the processor when the VMM determines the guest is at virtual ring-0. Such a control eliminates the need for the VMM to intervene since with SLAT enabled, the intervention action is to load the guest virtual address.

According to an aspect of the invention, the second level address translation 280 may be performed in various ways. In one embodiment, a SLAT table may be organized as a tree structure. In another embodiment, the SLAT table may be organized as a hashed page table. In either embodiment, the table referenced in the SLAT may be indexed by the guest physical address from the hardware oriented first level address translation. Additionally, the second level address translation may provide a physical page descriptor that contains a related physical address and access overrides.

Figure 3:
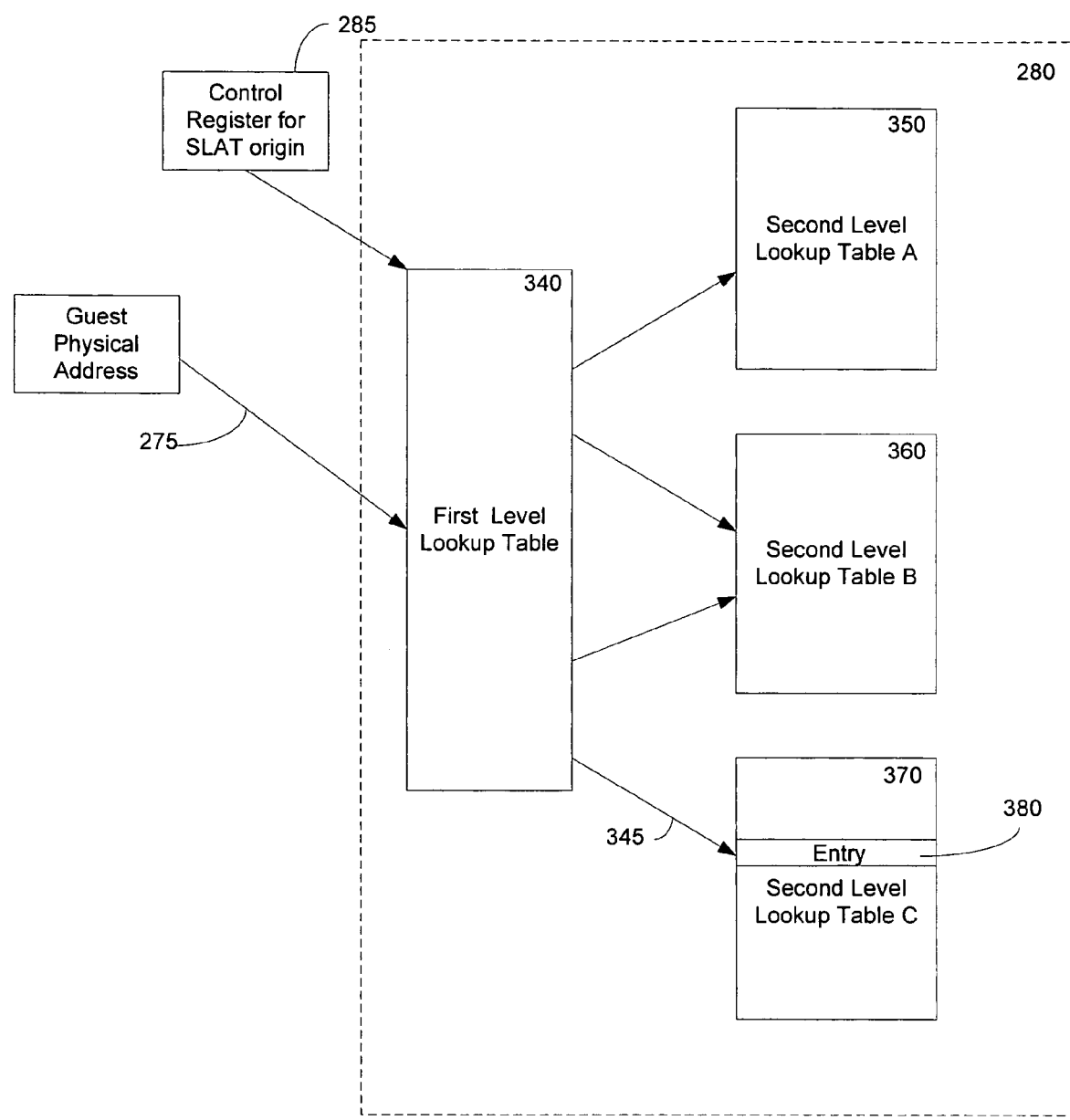
FIG. 3 is a first exemplary scheme to perform a second level address translation according to aspects of the invention.

FIG. 3 depicts an embodiment of a second level address translation 280 according to the invention. The second level address translation 280 of FIG. 3 is organized as a two-level tree. During a first level address translation, as typified in FIG. 2, guest physical addresses are available 275 along with a control register reference for a second level address translation origin location 285. The guest physical addresses 275 are used along with 315 with the SLAT origin 285 to produce a reference to a first level lookup table 340. In one embodiment, the control register SLAT origin 285 points to the first location of the first level lookup table. The upper bits of the guest physical address are used as an index for the first level lookup table 340 and the lower bits of the guest physical address are used as an index to the second level lookup table(s) 350, 360, 370. In the example of FIG. 3, the first level lookup table 340 produces a reference 345 to the second level lookup table 370 and directs the translation to a table entry 380. Entry 380 is the resulting host physical address.

In another embodiment of the invention, the time cost of a second level address translation may be avoided if the translation look-aside buffer contains appropriate second level address translation information. For example, in one embodiment, when a first level address translation is performed, guest physical addresses are determined from a guest virtual address as described in the first half of FIG. 1 at points 115, 125, 145, and 180. If a translation look-aside buffer is loaded with a guest physical address to host physical address correlation, then the first level address translation may be followed immediately by a TLB lookup to determine the host physical address from the guest physical address. This process essentially eliminates the need to perform multiple table walks as in FIG. 3 for the second level address translation. However, if the TLB does not have the guest physical address to host physical address correlation, then a second level address translation is needed. FIG. 3 is a depiction of one embodiment of a second level address translation.

If a second level address translation is needed, but the host physical address result is not present in the host, then a machine exception may be generated. This situation allows the VMM to become involved and either resolve the address translation or reflect a page fault to the guest.

Figure 4:
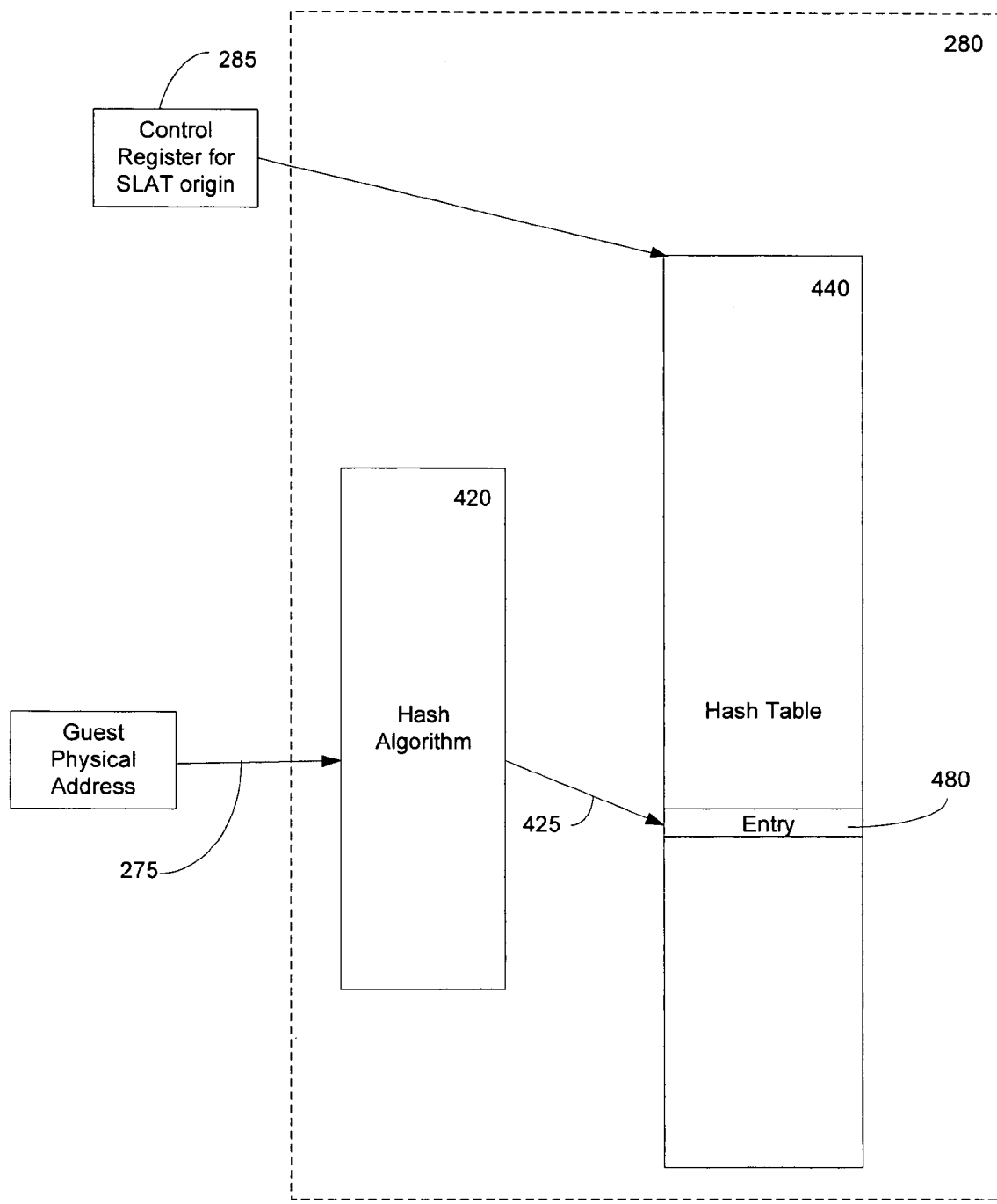
FIG. 4 is a second exemplary scheme to perform a second level address translation according to aspects of the invention.

FIG. 4 is an embodiment of a second level address translation 280 according to aspects of the invention. In this embodiment, a hash table 440 is organized as series of entries accessed by a hash algorithm 420 which uses the guest physical address result 275 of the first level translation of FIG. 2. The guest physical address input 275 is hashed using the algorithm 420 to produce a hash result 425. A control register 285 indicating a SLAT origin contains the physical address to the beginning of the SLAT table. In one embodiment, the size of the SLAT table is specified by another control register or the size may be encoded within the SLAT pointer. The size of the SLAT table defines the number of hash groups. Each group contains a fixed number of physical page descriptor (PPT) entries. The hash result 425 provides an index into the hash table 440. In one embodiment, the hash table 440 entries contain a host physical address, a guest page index with enough bits to disambiguate the entry from other entries of the same guest physical address hash, a 'present' flag and access override flags. An indexed entry in the hash table 440 contains the host physical address 480. Thus the hash table lookup embodiment serves the second level address translation function 280 of the FIG. 2 guest virtual address to host physical address scheme.

In another aspect of the invention access information is associated with the host physical address 380 and 480 of FIGS. 3 and 4 respectively. Initially, the guest virtual address access requested by the guest virtual machine most likely has access controls on the resulting guest physical address. These access controls regulate how the guest views access permissions on the guest physical address. However, in a virtual machine environment, the host process, or VMM should retain ultimate control on the access privileges associated with host physical memory. Thus a scheme for access controls within the second level address translation scheme is warranted.

Table 1 below indicates one embodiment of an entry in a second level address lookup table 380 of FIG. 3. Table 1 includes the host physical address (p), a guest index (x) and an access override field (a). Table 2 below indicates one embodiment of an entry in a second level address hash table 480 of FIG. 4. Table 2 includes a guest physical address (g), a host physical address (p) and an access override field (a).

TABLE 1

Exemplary FIG. 3 SLAT table entry

| Host Physical Address | Guest Index | Access Overrides |
|---|---|---|
| pppppppp pppppppp | xxxxxxxx xxxxxxxx | aaaaaaaa aaaaaaaa |

TABLE 2

Exemplary FIG. 4 SLAT hash table entry

| Host Physical Address | Guest Physical Address | Access Overrides |
|---|---|---|
| pppppppp pppppppp | gggggggg gggggggg | aaaaaaaa aaaaaaaa |

The use of access overrides associated with host physical addresses can occur in either the second level address translation tables or the TLB. These access overrides can protect the host physical address from misuse of the host physical memory by a virtual machine. Such access control can impose read, write or execute limitations on the memory accessed by a virtual machine. Other uses of access overrides may also be made. One example is that of placing break points or notifications of an area in memory that is accessed by a virtual machine on a host system resources. Other advantages of access protection include the ability to protect areas of the guest and host memory against malicious attack, the creation of memory-mapped regions to implement virtual memory mapped registers, allowing various debugging and diagnostic capabilities external to the guest and allowing an "owner" partition to define the cacheability of a page regardless of the guest's specification of cacheability.

Figure 5:
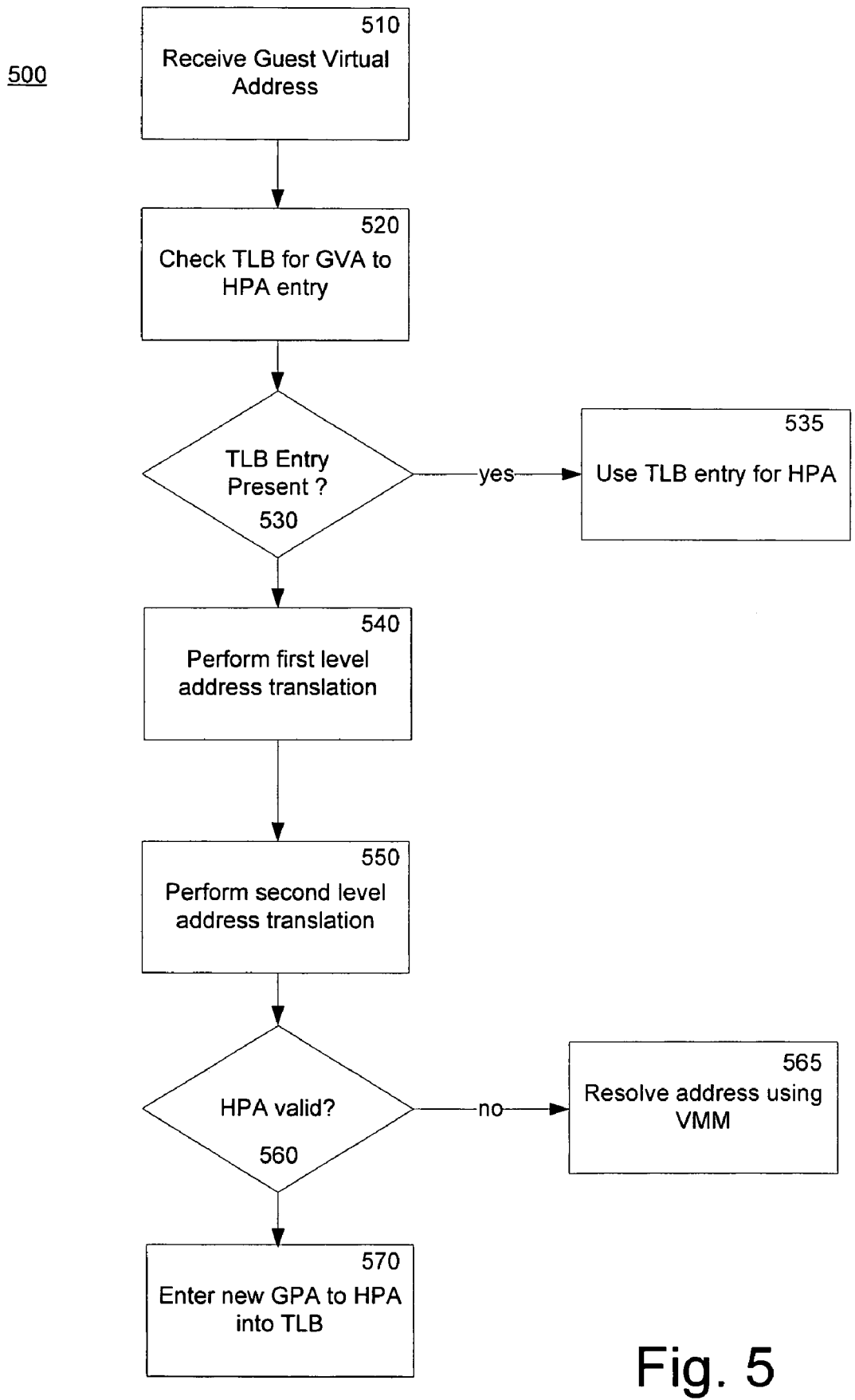
FIG. 5 is a flow diagram for an overall method of the invention.

FIG. 5 depicts a general method 500 for performing an address translation in a virtual machine from a guest virtual address to a host physical address. Initially, a guest virtual address is received (step 510) by a host computer to access for the virtual machine being serviced. The host CPU first checks the translation look-aside buffer (TLB) to determine if there is a pre-existing mapping between the guest virtual address and the host physical address (step 520). If an address is present that corresponds to the guest virtual address (step 530), then the host CPU uses the TLB entry and reads the host physical address from the TLB along with any access override information (step 535). If there is no TLB entry that corresponds to the guest virtual address, then the host CPU can determine the address.

A first level address translation is performed (step 540) to determine a guest physical address from the guest virtual address. This translation is a hardware oriented translation using facilities that the host CPU has for an address page walk. The intermediate page table accesses and the result of the first level translation and page walk are guest physical addresses. Each guest physical address now can be used as in input to perform a second level address translation (step 550). The result of the second level address translation is a host physical address with a corresponding access override information.

The host CPU can then access the host physical address location for the virtual machine program. It is possible that the host physical address is not valid (step 560). If an invalid host physical address is encountered, the host CPU can generate an exception and the CPU can be directed to resolve the address using the virtual machine monitor (step 565). If the host physical address is valid, then after a successful access to that location, a new TLB entry may be generated. This new TLB entry will lessen the impact of future address translation to the same address because the TLB may be used to supply the host physical address as was performed in steps 530 and 535.

In an aspect of the invention, the second level address translation may be used by a host computer wherever a virtual address from an application or operating system requires translation to a host physical address. For example, the second level address translation may be used where the host CPU is accessing local or machine memory, such as random access memory, or an I/O location. The second level address translation also finds utility to resolve host physical addresses when direct memory access (DMA) operations are being set up. In the instance of DMA, the host CPU can use aspects of the invention to resolve host physical addresses related to virtual addresses before the DMA operation begins.

FIG. 6a depicts one method 600 of performing a second level address translation corresponding to the step 550 in FIG. 5. A second level address translation may begin upon receipt of an guest physical address (step 610) from the first level address translation. A second level address translation (SLAT) origin may then be retrieved (step 615). In one embodiment, this SLAT origin information is stored in a hardware control register of the host CPU. The guest physical address and the SLAT origin may then be used to access a first level lookup table (step 620). In one embodiment, the high level address bits of the guest physical address act as an index to the first level lookup table and the SLAT origin is the first address of the first level lookup table. Having an index and a table origin, a second level lookup table origin may be accessed (step 625). In one embodiment, the lower level address bits of the guest physical address may be used as an index for the second level table access. The second level table origin being derived from reading the first level lookup table indexed entry.

Once the second level address lookup table entry is identified, the entry may be read (step 630). The table entry is a host physical address corresponding to the guest physical address received in step 610. In addition, access control information may be read (step 635) that controls the access permissions for the host physical address. This host physical address access control information overrides the initial guest physical address access controls.

FIG. 6b depicts one method 690 of performing a second level address translation corresponding to the step 550 in FIG. 5. A second level address translation may begin upon receipt of an guest physical address (step 640) from the first level address translation. In this embodiment, a hash of the guest physical address is generated (step 645). A second level address translation (SLAT) origin is retrieved (step 650). In one embodiment, this SLAT origin information is stored in a hardware control register of the host CPU. The guest physical address hash and the SLAT origin may then be used to access a hash table (step 650). The guest physical address hash acts as an address offset or index against the SLAT origin defining the start of the hash table.

The corresponding hash table entry is a host physical address corresponding to the guest physical address received in step 640. In addition, access control information may be read (step 660) that controls the access permissions for the host physical address. This host physical address access control information overrides the initial guest physical address access controls. One benefit of a hash table is that a range of hash table entries may be accessed by the method 690. Accordingly, a range of guest physical to host physical address pairs may be searched per slot or group. This grouping provides a multiple entry search opportunity for the detection of the appropriate host physical address.

Exemplary Computing Device

Figure 7:
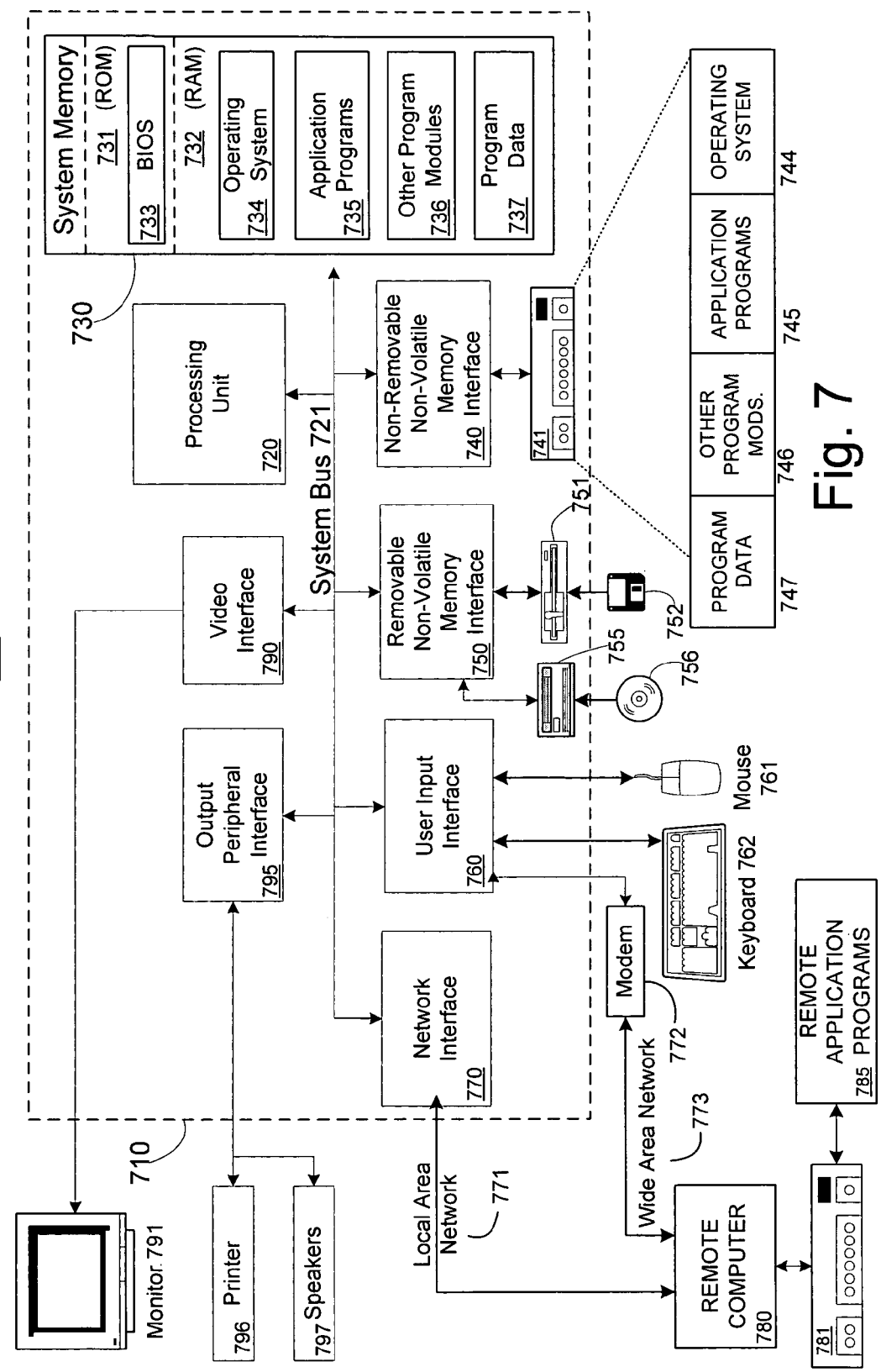
FIG. 7 is a block diagram showing an exemplary computing environment in which aspects of the invention may be implemented.

FIG. 7 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

In the context of a virtual machine environment, the computing environment of FIG. 7 may be implemented with one or more processors where a host operating system may service a multiplicity of different virtual machines. In this context, the configuration of FIG. 7 provides an exemplary instance of a single CPU system with the capability to host multiple virtual machines, each having an operating system and requesting hardware resources from the host computer of FIG. 7.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 7 thus illustrates an example of a suitable computing system environment 700 in which the embodiments of the invention may be implemented, although as made clear above, the computing system environment 700 is only one example of a suitable computing environment and is not intended to suggest any limitation as to the scope of use or functionality of an embodiment of the invention. Neither should the computing environment 700 be interpreted as having any dependency or requirement relating to any one or combination of components illustrated in the exemplary operating environment 700.

With reference to FIG. 7, an exemplary system for implementing an embodiment of the invention includes a general purpose computing device in the form of a computer system 710. Components of computer system 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 710 typically includes a variety of computer readable media. Computer readable media can be any available media that can be accessed by computer system 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer system 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer system 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for the computer system 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer system 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB). A monitor 791 or other type of display device is also connected to the system bus 721 via an interface, such as a video interface 790, which may in turn communicate with video memory (not shown). In addition to monitor 791, computer systems may also include other peripheral output devices such as speakers 797 and printer 796, which may be connected through an output peripheral interface 795.

The computer system 710 may operate in a networked or distributed environment using logical connections to one or more remote computers, such as a remote computer 780. The remote computer 780 may be a personal computer, a server, a router, a network PC, a peer device or other common network node, and typically includes many or all of the elements described above relative to the computer system 710, although only a memory storage device 781 has been illustrated in FIG. 7. The logical connections depicted in FIG. 7 include a local area network (LAN) 771 and a wide area network (WAN) 773, but may also include other networks/buses. Such networking environments are commonplace in homes, offices, enterprise-wide computer networks, intranets and the Internet.

When used in a LAN networking environment, the computer system 710 is connected to the LAN 771 through a network interface or adapter 770. When used in a WAN networking environment, the computer system 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer system 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement an fast translation from a guest virtual address to a host physical address in a virtual machine environment. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of performing a translation from a guest virtual address to a host physical address in a virtual machine environment having a virtual machine monitor, the method comprising:
    receiving a guest virtual address from a host computer executing a guest virtual machine program;
    checking a translation look-aside buffer (TLB) to determine if there is a pre-existing mapping between the guest virtual address and the host physical address, wherein if the pre-existing mapping exists, using the pre-existing mapping, and wherein if the pre-existing mapping does not exist, then performing the translation as follows:
    determining a guest physical address, the guest physical address being determined using the guest virtual address and a first level address translation executed on the host computer;
    performing a second level address translation using at least one table and the guest physical address as an index by performing a hash with the guest physical address, the hash determining an index for the at least one table containing the host physical address and an access override information;
    reading a host physical address and an access override information from the at least one table; and
    providing the host physical address and the access override information to the host computer;
    wherein, the access override information performs access control over the host physical address, the access control overriding a guest-defined access protection on the guest physical address, and wherein the translation from the guest virtual address to the host physical address is performed without intervention by the virtual machine monitor.

2. The method of claim 1, further comprising:
    entering the received guest virtual address, the host physical address and the access override information into a translation look-aside buffer (TLB), wherein subsequent accesses to the host physical address from the guest virtual address are conducted without performing the first level address translation and the second level address translation.

3. The method of claim 1, further comprising:
    entering the received guest physical address and host physical address into the translation look-aside buffer, wherein subsequent accesses to the host physical address from the guest physical address are conducted without performing the second address translation.

4. The method of claim 1, wherein performing a second level address translation using at least one table and the guest physical address as an index comprises:
    accessing a first level lookup table using a first portion of the guest physical address to determine a page for the host physical address; and
    accessing a second level lookup table using a second portion of the guest physical address to determine an address for the host physical address;
    wherein the first portion and the second portion of the guest physical address act as an index for the at least one table of the second level address translation.

5. The method of claim 1, wherein the translation from a guest virtual address to a host physical address is used by direct memory access (DMA) operations.

6. The method of claim 1, further comprising:
    generating a processor exception if a host physical address is not available from the table, wherein the processor exception is used to call a virtual memory monitor to supply a host physical address corresponding to the guest physical address.

7. A system to determine a host physical address from a guest virtual address in a virtual machine environment, the system comprising:
    a host memory;
    first level address translation hardware performing an address translation from a guest virtual address to a guest physical address;
    second level address translation hardware performing an address translation from a guest physical address to a host physical address;
    a translation look-aside buffer having translations between guest virtual addresses and corresponding host physical addresses;
    host software functionality forming a virtual machine monitor (VMM), the VMM accommodating multiple virtual machine programs along with a host operating system;
    a host processor, executing instructions and performing steps comprising:
    receiving a guest virtual address;
    checking the translation look-aside buffer (TLB) to determine if there is a pre-existing mapping between the guest virtual address and a corresponding host physical address, wherein if the pre-existing mapping exists, using the pre-existing mapping to access the host physical address, and wherein if the pre-existing mapping does not exist, then performing the translation as follows:
    inputting the guest virtual address into the first level translation hardware;
    determining at least one of intermediate and final guest physical addresses using the first level address translation hardware;
    inputting the at least one of the intermediate and final guest physical addresses into the second level address translation hardware;
    determining a host physical address and access override information using the second level address translation hardware, wherein the second level address translation hardware uses the guest physical address as an index, and wherein the use of the guest physical address as an index comprises performing a hash with the guest physical address, the hash determining an index for a table containing the host physical address and the access override information; and providing the host physical address and access override information to the host processor;

wherein, the access override information performs access control over the host physical address, the access control overriding a guest-defined access protection on the at least one of intermediate and final guest physical address, and wherein the translation from the guest virtual address to the host physical address is performed without intervention by the VMM.

8. The system of claim 7, wherein the steps further comprise:

loading the guest virtual address to host physical address translation into the translation look-aside buffer, wherein the guest virtual address to host physical address translation with corresponding access override is loaded into the translation look-aside buffer for subsequent fast access to address translation without using the first address translation hardware or the second address translation hardware.

9. The system of claim 7, wherein the use of the guest physical address as an index comprises:

accessing a first level lookup table using a first portion of the guest physical address as an index to determine a page for the host physical address; and accessing a second level lookup table using a second portion of the guest physical address as an index to determine an address for the host physical address.

10. The system of claim 7, wherein the host processor comprises an x86 family processor.

11. The system of claim 10, furhter comprising a first control register CR3, a second control register comprises a second level address translation enablement indicator, and a third register comprises a second level address location table origin.

12. A computer-readable storage medium having computer-executable instructions for performing a method of performing a translation from a guest virtual address to a host physical address in a virtual machine environment having a virtual machine monitor (VMM), the method comprising:

receiving a guest virtual address;

checking a translation look-aside buffer (TLB) to determine if there is a pre-existing mapping between a guest virtual address and a corresponding host physical address, wherein if the pre-existing mapping exists, using the pre-existing mapping to access the host physical address, and wherein if the pre-existing mapping does not exist, then performing the translation as follows:

inputting the guest virtual address into first level translation hardware;

translating the guest virtual address into a guest physical address using the first level address translation hardware;

inputting the guest physical address into second level address translation hardware;

translating the guest physical address into a host physical address and an access override information using the second level address translation hardware using at least one table and the guest physical address as an index, and performing a hash with the guest physical address, the hash determining an index for a table containing the host physical address and the access override information; and providing the host physical address and access override information to a host processor in the virtual machine environment;

wherein, the access override information performs access control over the host physical address, the access control overriding a guest-defined access protection on the guest physical address, and wherein the translation from the guest virtual address to the host physical address is performed without intervention by the VMM.

13. The computer-readable storage medium of claim 12, further comprising the method step of:

entering the received guest virtual address, the host physical address and the access override information into the TLB, wherein subsequent accesses to the host physical address from the guest virtual address are conducted without performing the first level address translation and the second level address translation.

14. The computer-readable storage medium of claim 12, wherein the method step of translating the guest physical address into a host physical address and an access override information using the second level address translation hardware further comprises using at least one table and the guest physical address as an index wherein a first portion of the guest physical address is used to determine a page for the host physical address and a second portion of the guest physical address is used to determine an address for the host physical address.

15. The computer-readable storage medium of claim 12, wherein if the method step of translating the guest physical address into a host physical address and an access override information using the second level address translation hardware does not produce a valid host physical address, the method further comprising generating a processor exception, wherein the processor exception is used to call a virtual memory monitor to supply a host physical address corresponding to the guest physical address.

* * * * *